United States Patent
Baek

(10) Patent No.: US 11,679,778 B2
(45) Date of Patent: Jun. 20, 2023

(54) METHOD AND DEVICE FOR ASSISTING VISION OF A VEHICLE DRIVER

(71) Applicants: HYUNDAI MOTOR COMPANY, Seoul (KR); KIA CORPORATION, Seoul (KR)

(72) Inventor: Jooam Baek, Gwangmyeong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 70 days.

(21) Appl. No.: 17/505,280

(22) Filed: Oct. 19, 2021

(65) Prior Publication Data

US 2022/0185308 A1 Jun. 16, 2022

(30) Foreign Application Priority Data

Dec. 10, 2020 (KR) ........................ 10-2020-0172014

(51) Int. Cl.
*B60W 50/14* (2020.01)
*B60W 40/02* (2006.01)
(Continued)

(52) U.S. Cl.
CPC ............ *B60W 50/14* (2013.01); *B60K 35/00* (2013.01); *B60Q 1/525* (2013.01); *B60W 40/02* (2013.01);
(Continued)

(58) Field of Classification Search
CPC .. B60W 50/14; B60W 40/02; B60W 2555/20; B60W 2050/146; G06V 20/56;
(Continued)

(56) References Cited

U.S. PATENT DOCUMENTS

| | | | | |
|---|---|---|---|---|
| 5,432,509 A | * | 7/1995 | Kajiwara | ............... B60Q 9/008 340/556 |
| 8,749,635 B2 | | 6/2014 | Hogasten et al. | |

(Continued)

FOREIGN PATENT DOCUMENTS

| | | | | |
|---|---|---|---|---|
| EP | 2187236 A1 | * | 5/2010 | ........... G01S 13/867 |
| KR | 20120038431 A | | 4/2012 | |
| WO | WO-2018110724 A1 | * | 6/2018 | ............ B60W 40/02 |

*Primary Examiner* — Chico A Foxx
(74) *Attorney, Agent, or Firm* — Lempia Summerfield Katz LLC

(57) ABSTRACT

A method for assisting a vision of a driver includes: receiving a signal indicating that weather information is emergency weather information from a navigation device according to setting by a vehicle driver, and turning on a vision assisting device included in the vehicle in response to the signal; obtaining an image of an infrared thermal camera of the vision assisting device, which photographs a front of the vehicle when the vehicle travels, and obtaining an image of a camera of the vision assisting device, which photographs the front of the vehicle when the vehicle travels; controlling an image processor of the vision assisting device to determine whether a matching rate between image data of the infrared thermal camera and image data of the camera is equal to or less than a first threshold; and, when the matching rate is equal to or less than the first threshold, using distances between the vehicle and respective objects located at the front, a rear, and sides of the traveling vehicle, speeds of the respective objects, which are detected by a radar sensor of the vision assisting device, and the images of the infrared thermal camera photographing the front of the vehicle to generate a surrounding state image of the vehicle, which includes the distances and the speeds.

20 Claims, 3 Drawing Sheets

(51) Int. Cl.
*B60K 35/00* (2006.01)
*B60Q 1/52* (2006.01)
*G06K 9/00* (2022.01)
*H04N 5/33* (2023.01)
*B60Q 1/50* (2006.01)
*G06V 20/56* (2022.01)

(52) U.S. Cl.
CPC .............. *G06V 20/56* (2022.01); *H04N 5/33* (2013.01); *B60K 2370/1529* (2019.05); *B60K 2370/176* (2019.05); *B60K 2370/178* (2019.05); *B60K 2370/1868* (2019.05); *B60K 2370/785* (2019.05); *B60W 2050/146* (2013.01); *B60W 2555/20* (2020.02)

(58) Field of Classification Search
CPC ........... B60K 35/00; B60K 2370/1529; B60K 2370/178; B60K 2370/176; B60K 2370/1868; B60K 2370/785; B60Q 1/525; H04N 5/33
See application file for complete search history.

(56) References Cited

U.S. PATENT DOCUMENTS

| | | | |
|---|---|---|---|
| 9,083,897 B2 | 7/2015 | Hogasten et al. | |
| 2006/0224301 A1* | 10/2006 | Sakagami | G01C 21/26 701/500 |
| 2006/0250224 A1* | 11/2006 | Steffel | G01S 13/931 340/435 |
| 2007/0049260 A1* | 3/2007 | Yuhara | H04L 67/52 455/414.3 |
| 2007/0152804 A1* | 7/2007 | Breed | G01S 19/17 701/301 |
| 2008/0046150 A1* | 2/2008 | Breed | B60R 21/0134 701/45 |
| 2010/0309315 A1* | 12/2010 | Hogasten | H04N 5/33 348/E5.09 |
| 2012/0212615 A1* | 8/2012 | Ishii | G06V 10/48 348/148 |
| 2014/0285672 A1* | 9/2014 | Hogasten | H04N 23/11 348/164 |
| 2018/0141523 A1* | 5/2018 | Otomi | B60S 1/486 |
| 2019/0248347 A1* | 8/2019 | Kim | B60W 30/0956 |
| 2019/0337533 A1* | 11/2019 | Kume | B60W 50/14 |
| 2021/0089048 A1* | 3/2021 | Tran | B60R 25/257 |
| 2021/0300259 A1* | 9/2021 | Shibata | B60Q 9/008 |
| 2022/0314982 A1* | 10/2022 | Matsumoto | B60W 50/14 |

* cited by examiner

METHOD AND DEVICE FOR ASSISTING VISION OF A VEHICLE DRIVER

CROSS-REFERENCE TO RELATED APPLICATION

This application claims priority to and the benefit of Korean Patent Application No. 10-2020-0172014 filed in the Korean Intellectual Property Office on Dec. 10, 2020, the entire contents of which are incorporated herein by reference.

BACKGROUND

(a) Field of the Disclosure

The present disclosure relates to a driver assistance system (DAS) of a vehicle driver, and more particularly, to a method and a device for assisting the vision of a vehicle driver.

(b) Description of the Related Art

In general, vehicles mean a moving means or transporting means for traveling on a road or a railroad by using fossil fuels, electricity, etc., as a power source. The vehicles can mainly move to several locations using one or more wheels installed in a vehicle body. Such vehicles may include three-wheel or four-wheel vehicles, two-wheel vehicles, such as motorcycles, etc., construction machines, bicycles, and trains, which travel on rails or tracks on railroads.

In recent years, research has been actively conducted into vehicles equipped with an advanced driver assist system (ADAS) that actively provides information on a vehicle state, a driver's state, and a surrounding environment to reduce a burden of a driver and promote the convenience for the driver of the vehicle.

Examples of the ADAS provided on vehicles includes Forward Collision Avoidance (FCA), Autonomous Emergency Brake (AEB), or Driver Attention Warning (DAW).

The above information disclosed in this Background section is only to enhance understanding of the background of the disclosure. Therefore, the Background section may contain information that does not form the prior art that is already known to a person of ordinary skill in the art.

SUMMARY

The present disclosure has been made in an effort to provide a method and a device for assisting the vision of a vehicle driver. The method and device generate images based on data acquired by comparing images of an infrared thermal camera and a camera that photograph the front of a vehicle, which travels in an emergency weather situation due to rain or snow, a distance between the vehicle and an object located in front of the vehicle, a speed of the object, and the image of the thermal camera. Thus, the images may be provided to a driver of the vehicle to prevent a traffic accident.

An embodiment of the present disclosure provides a method for assisting the vision of a vehicle driver. The method includes receiving, by a controller, a signal indicating that weather information is emergency weather information from a navigation device according to setting by a driver of a vehicle, and turning on a vision assisting device of the vehicle driver included in the vehicle in response to the signal. The method also includes obtaining, by the controller, an image of an infrared thermal camera of the vision assisting device, which photographs a front of the vehicle when the vehicle travels. The method also includes obtaining an image of a camera of the vision assisting device, which photographs the front of the vehicle when the vehicle travels. The method also includes controlling, by the controller, an image processor of the vision assisting device to determine whether a matching rate between image data of the infrared thermal camera and image data of the camera is equal to or less than a first threshold. The method further includes, when the matching rate is equal to or less than the first threshold, using, by the controller, distances between the vehicle and respective objects located at the front, a rear, and sides of the vehicle when traveling, speeds of the respective objects, which are detected by a radar sensor of the vision assisting device of the vehicle driver, and the images of the infrared thermal camera photographing the front of the vehicle to generate a surrounding state image of the vehicle, which includes the distances and the speeds.

The method may further include controlling, by the controller, a head-up display (HUD) device to display the surrounding state image of the vehicle on a windshield of the vehicle.

The method may further include: generating, by the controller, a warning message, which is included in the surrounding state image of the vehicle, based on the distances and speeds; and controlling, by the controller, the head-up display (HUD) device to display the warning message on the windshield of the vehicle.

The method may further include, when the matching rate is equal to or less than the first threshold, turning on, by the controller, an emergency light switch included in the vision assisting device and turning on the emergency light of the vehicle.

The method may further include receiving, by the controller, the weather information of a place at which the vehicle is located, from a server located outside the vehicle through a communicator of the vision assisting device.

The emergency weather information may include rainy or snowy weather information.

The image processor may convert the image data of the infrared thermal camera and image data of the camera into gray scale images, respectively, and compare the converted image data to calculate the matching rate.

Another embodiment of the present disclosure provides a method for assisting the vision of a vehicle driver. The method includes receiving, by a controller, a signal indicating that weather information is emergency weather information from a navigation device according to setting by a driver of a vehicle, and turning on a vision assisting device of the vehicle driver included in the vehicle in response to the signal. The method also includes obtaining, by the controller, an image of an infrared thermal camera of the vision assisting device, which photographs a front of the vehicle when the vehicle travels, and obtaining an image of a camera of the vision assisting device, which photographs the front of the vehicle when the vehicle travels. The method also includes controlling, by the controller, an image processor of the vision assisting device to determine whether a matching rate between image data of the infrared thermal camera and image data of the camera is more than a first threshold and equal to or less than a second threshold. The method also includes, when the matching rate is more than the first threshold and equal to or less than the second threshold, determining, by the controller, whether a signal indicating whether the vision assisting device of the vehicle driver needs to be used is received by the controller, from the navigation device. The method also includes, when the signal indicating whether the vision assisting device of the vehicle driver needs to be used is received, using, by the controller, distances between the vehicle and respective objects located at the front, a rear, and sides of the vehicle when traveling, speeds of the respective objects, which are detected by a radar sensor of the vision assisting device, and the images of the infrared thermal camera photographing the front of the vehicle to generate a surrounding state image of the vehicle, which includes the distances and the speeds.

The method may further include controlling, by the controller, a head-up display (HUD) device to display the surrounding state image of the vehicle on a windshield of the vehicle.

The method may further include: generating, by the controller, a warning message, which is included in the surrounding state image of the vehicle, based on the distances and speeds; and controlling, by the controller, the head-up display (HUD) device to display the warning message on the windshield of the vehicle.

The method may further include, when the signal indicating whether the vision assisting device needs to be used is received, turning on, by the controller, an emergency light switch that is included in the vision assisting device and turns on an emergency light of the vehicle.

The method may further include receiving, by the controller, the weather information of a place at which the vehicle is located from a server located outside the vehicle through a communicator of the vision assisting device.

The emergency weather information may include rainy or snowy weather information.

The image processor may convert the image data of the infrared thermal camera and image data of the camera into gray scale images, respectively, and compare the converted image data to calculate the matching rate.

Yet another embodiment of the present disclosure provides a device for assisting the vision of a vehicle driver. The device includes: an infrared thermal camera photographing, when a vehicle travels, a front of the vehicle; a camera photographing, when the vehicle travels, the front of the vehicle; and a controller receiving a signal indicating that weather information is emergency weather information from a navigation device according to setting by a driver of a vehicle, and turning on a vision assisting device of the vehicle driver included in the vehicle in response to the signal. The controller obtains an image of the infrared thermal camera and an image of a camera of the vision assisting device. The controller controls an image processor of the vision assisting device to determine whether a matching rate between image data of the infrared thermal camera and image data of the camera is equal to or less than a first threshold. When the matching rate is equal to or less than the first threshold, the controller uses distances between the vehicle and respective objects located at the front, a rear, and sides of the vehicle when traveling, speeds of the respective objects, which are detected by a radar sensor of the vision assisting device, and the images of the infrared thermal camera to generate a surrounding state image of the vehicle, which includes the distances and the speeds.

The controller may control a head-up display (HUD) device to display the surrounding state image of the vehicle on a windshield of the vehicle.

The controller may generate a warning message, which is included in the surrounding state image of the vehicle, based on the distances and speeds. The controller may control the head-up display (HUD) device to display the warning message on the windshield of the vehicle.

When the matching rate is equal to or less than a first threshold, the controller may turn on an emergency light switch included in the vision assisting device and may turn on the emergency light of the vehicle.

The controller may receive the weather information of a place at which the vehicle is located, from a server located outside the vehicle through a communicator of the vision assisting device.

The image processor may convert the image data of the infrared thermal camera and image data of the camera into gray scale images, respectively, and compare the converted image data to calculate the matching rate.

According to embodiments of the present disclosure, a method and a device for assisting the vision of a vehicle driver generate images based on data acquired by comparing images of an infrared thermal camera and a camera that photograph the front of a vehicle, which travels in an emergency weather situation due to rain or snow, a distance between the vehicle and an object located in front of the vehicle, a speed of the object, and the image of the thermal camera. The method and device provide the images to a driver of the vehicle to prevent a traffic accident.

Further, according to an embodiment of the present disclosure, for safe traveling of the driver, an image for the emergency weather situation can be provided by using reliable information received from a sensor such as a camera for an external situation of the vehicle.

BRIEF DESCRIPTION OF THE DRAWINGS

A brief description of each drawing is provided in order to more sufficiently appreciate drawings used in a detailed description of the present disclosure.

DETAILED DESCRIPTION OF THE EMBODIMENTS

Figure 1:
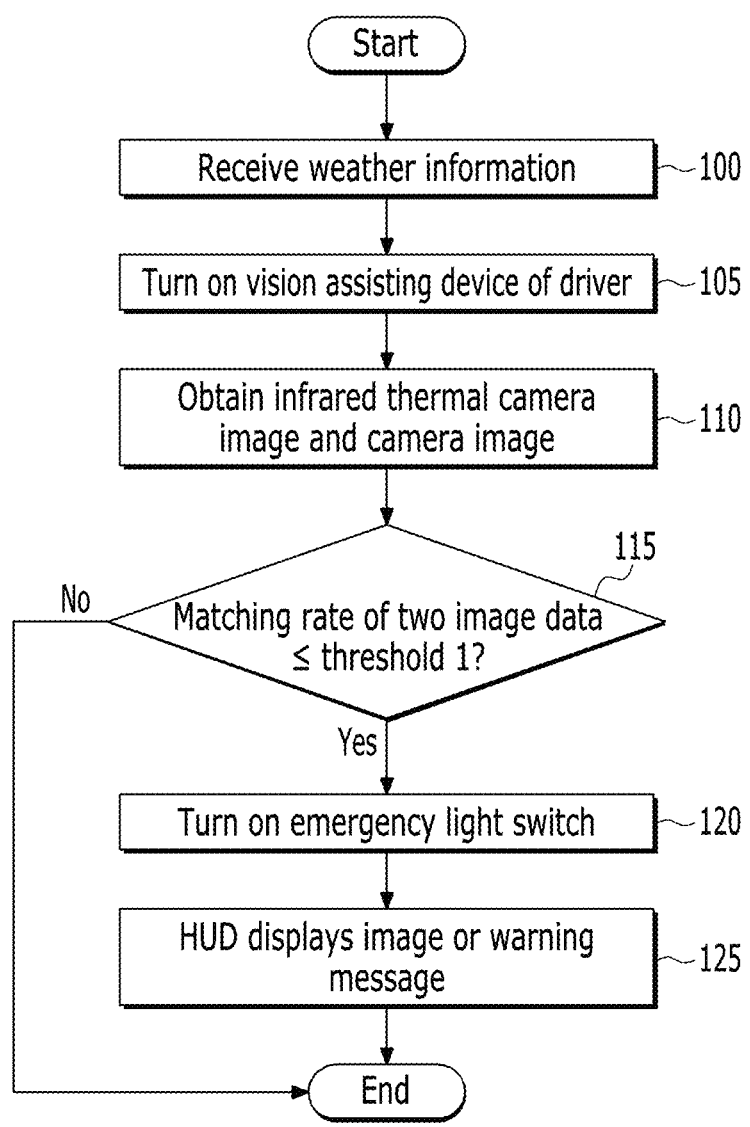
FIG. 1 is a flowchart for describing a method for assisting a vision of a vehicle driver according to an embodiment of the present disclosure.

In order to sufficiently appreciate objects achieved by the present inventive concept and embodiments of the present disclosure, one should refer to the accompanying drawings illustrating the embodiments of the present disclosure and contents disclosed in the accompanying drawings.

Hereinafter, the present disclosure is described in detail by describing the embodiments of the present disclosure with reference to the accompanying drawings. In the following description, a detailed explanation of related known configurations or functions has been omitted to avoid obscuring the subject matter of the present disclosure. Terms used in the present specification are used only to describe specific embodiments and are not intended to limit the present disclosure.

A singular form may include a plural form if there is no clearly opposite meaning in the context. In the present specification, it should be understood that the terms "include" or "have" indicate that a feature, a number, a step, an operation, a component, a part or the combination thereof described in the specification is present. Such terms do not exclude a possibility of presence or addition of one or more other features, numbers, steps, operations, components, parts, or combinations thereof, in advance.

Throughout the specification, when it is described that a part is "connected" with another part, it means that the certain part may be "directly connected" with another part or that the parts are "electrically or mechanically connected" to each other with a third element interposed therebetween as well.

If it is not contrarily defined, all terms used herein including technological or scientific terms have the same meanings as those generally understood by those having ordinary skill in the art. Terms, which are defined in a generally used dictionary, should be interpreted to have the same meaning as the meaning in the context of the related art and should not be interpreted as having ideal meanings or excessively formal meanings unless clearly defined in the present specification. When a component, device, element, or the like of the present disclosure is described as having a purpose or performing an operation, function, or the like, the component, device, or element should be considered herein as being "configured to" meet that purpose or to perform that operation or function.

An automobile (vehicle) is the most commonly used means as a moving or traveling means, regardless of the weather. However, rainy or snowy weather adversely affects a driver in contrast to the vision of a vehicle driver on a clear day. Because of raindrops that hit directly onto a windshield of the vehicle, objects in front of the vehicle may not be visible properly. Therefore, the driver should be more concerned about securing their vision than usual. In the case of a rainy or snowy day, a rate of incidence of traffic accidents is high.

A video system of a vehicle according to relevant technology uses an infrared camera in an environment where there is no external illumination during night driving of the vehicle to secure a wide sight required for safe driving by a vehicle driver. However, the video system of the vehicle may not provide appropriate visual views of a surrounding situation of the vehicle to the driver by reflecting various environments (e.g., weather information) outside the vehicle.

Figure 2:
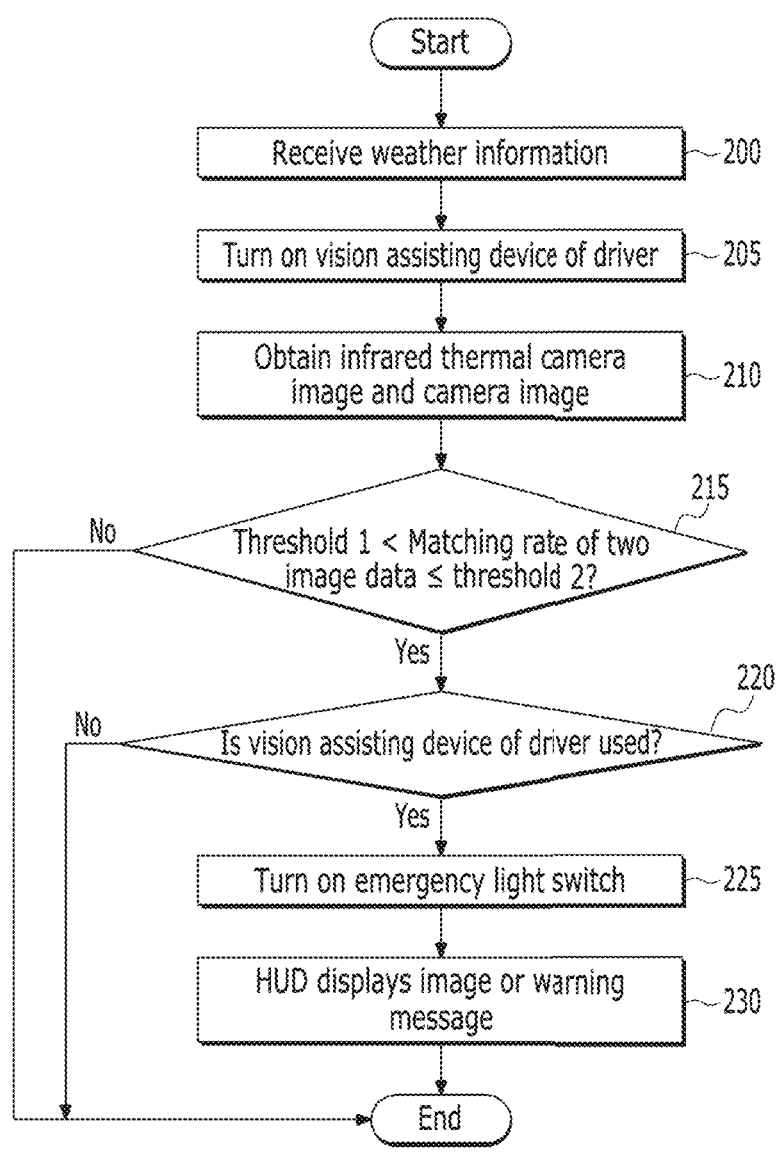
FIG. 2 is a flowchart for describing a method for assisting a vision of a vehicle driver according to another embodiment of the present disclosure.
Figure 3:
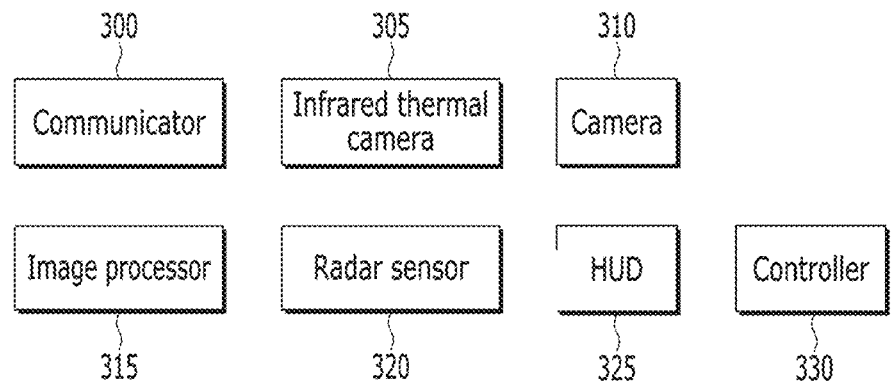
FIG. 3 is a block diagram for describing a device for assisting a vision of a vehicle driver to which the method for assisting a vision of a vehicle driver illustrated in FIG. 1 or 2 is applied.

FIG. 1 is a flowchart for describing a method for assisting the vision of a vehicle driver according to an embodiment of the present disclosure. FIG. 2 is a flowchart for describing a method for assisting the vision of a vehicle driver according to another embodiment of the present disclosure. FIG. 3 is a block diagram for describing a device for assisting the vision of a vehicle driver to which the method for assisting the vision of a vehicle driver illustrated in FIG. 1 or 2 applies.

Referring to FIGS. 1 and 3, in receiving step 100, a controller 330 may receive weather information of a place at which a vehicle is located from a server (e.g., a telematics server) installed (located) outside the vehicle through a communicator 300. The telematics server may provide mobile communication service information including the weather information and traffic information to the vehicle.

The device for assisting the vision of a vehicle driver may include the communicator 300, an infrared thermal camera or infrared camera 305, a camera (a general camera included in a Drive Video Record System (or black box) of the vehicle, which is a vehicle built-in drive video recording device) 310, an image processor 315, a radar sensor 320, a head-up display (HUD) device 325, and the controller 330.

The controller 330 as an electronic control unit (ECU) may control an overall operation of the vision assisting device. The controller 330 may be, for example, one or more microprocessors, which operate by a program (control logic) or hardware (e.g., a microcomputer) including the microprocessors. The program may include a series of instructions for performing the method for assisting the vision of a vehicle driver according to an embodiment of the present disclosure.

The instructions may be stored in a memory of the vision assisting device or the controller 330.

According to step 105, when the driver of the vehicle confirms that the weather information is emergency weather information including rainy or snowy weather information, the controller 330 may turn on the vision assisting device except for the controller. For example, the driver of the vehicle may turn on the vision assisting device in a user setting mode (USM) of an Audio Video Navigation (AVN) device (or a navigation device) included in the vision assisting device. The controller 330 may receive a signal indicating that the weather information is the rainy or snowy weather information from the navigation device.

According to step 110, the controller 330 may obtain, from the infrared thermal camera, an image of the infrared thermal camera 305 that photographs the front of the vehicle when the vehicle travels and obtain, from the camera, an image of the camera 310 that photographs the front of the vehicle when the vehicle travels.

According to step 115, the controller 330 may control the image processor 315 to determine whether a matching rate between image data of the infrared thermal camera 305 and image data of the camera 310 is equal to or less than a first threshold (threshold 1). For example, the image processor 315 may convert the image data of the infrared thermal camera 305 and the image data of the camera 310 into gray scale images, respectively, and compare the converted image data (e.g., brightness values) to calculate the matching rate. The first threshold, which is a value for driving the vision assisting device, may be determined by a test (or an experiment).

When the matching rate is equal to or less than the first threshold, the vision assisting method may proceed to step 120.

According to step 120, the controller 330 may turn on an emergency light switch that is included in the vision assisting device and automatically turns on an emergency light (e.g., an emergency light of a vehicle front or an emergency light of a vehicle rear) of the vehicle. In another embodiment of the present disclosure, step 120 may be omitted.

According to step 125, after step 120, the controller 330 uses distances between the vehicle and respective objects (e.g., vehicles) located at the front, the rear, and the sides of the vehicle when traveling. The controller 330 also uses speeds of the respective objects, which are detected by the radar sensor 320 using electromagnetic waves. The controller 330 also uses the images of the infrared thermal camera 305 photographing the front of the vehicle. Thus, at step 125, a surrounding state image (e.g., thermal image) of the vehicle, which includes the distances and the speeds, may be generated. The controller 330 may generate a warning message, which is included in the surrounding state image of the vehicle, based on the distances and speeds. For example, when the distance is 50 (m) or more and there is no change in speed, the warning message may be a message "maintenance of a current speed of the vehicle". When the distance is 50 (m) or more and there is the change in speed, the warning message may be a message "the speed of a forward vehicle is X km/h, be careful of the speed". So as for the driver of the vehicle to view the surrounding state image of the vehicle or the warning message, the controller 330 may control the HUD device 325 to display the surrounding state image of the vehicle or the warning message on a windshield (or vehicle front glass (windshield glass)) of the vehicle.

In another embodiment of the present disclosure, steps 120 and 125 may be simultaneously performed (progressed).

Referring to FIGS. 2 and 3, in receiving step 200, the controller 330 may receive the weather information of the place at which the vehicle is located from the server (e.g., the telematics server) installed (located) outside the vehicle through the communicator 300.

According to step 205, when the driver of the vehicle confirms that the weather information is emergency weather information including rainy or snowy weather information, the controller 330 may turn on the vision assisting device except for the controller. For example, the driver of the vehicle may turn on the vision assisting device in a user setting mode (USM) of an Audio Video Navigation (AVN) device (or a navigation device) included in the vision assisting device. The controller 330 may receive a signal indicating that the weather information is the rainy or snowy weather information from the navigation device.

According to step 210, the controller 330 may obtain, from the infrared thermal camera, an image of the infrared thermal camera 305 that photographs the front of the vehicle when the vehicle travels and obtain, from the camera, an image of the camera 310 that photographs the front of the vehicle when the vehicle travels.

According to step 215, the controller 330 may control the image processor 315 to determine whether a matching rate between image data of the infrared thermal camera 305 and image data of the camera 310 is more than the first threshold and equal to or less than a second threshold. The second threshold, which is a value for the driver of the vehicle to selectively drive the vision assisting device of the vehicle driver, may be determined by a test (or an experiment).

When the matching rate is more than the first threshold and equal to or less than the second threshold, the vision assisting method may proceed to step 220.

According to step 220, the controller 330 may determine whether the controller receives a signal indicating whether the vision assisting device needs to be used from the navigation device. For example, the driver of the vehicle may configure whether the vision assisting device needs to be used in the navigation device.

According to step 225, when it is determined that the vision assisting device needs to be used, the controller 330 may automatically turn on an emergency light switch that turns on an emergency light of the vehicle. In another embodiment of the present disclosure, step 225 may be omitted.

According to step 230, after step 225, the controller 330 uses distances between the vehicle and respective objects (e.g., vehicles) located at the front, the rear, and the sides of the vehicle when traveling. The controller 330 also uses speeds of the respective objects, which are detected by the radar sensor 320. The controller 330 also uses the images of the infrared thermal camera 305 photographing the front of the vehicle. Thus, at step 230, a surrounding state image (e.g., thermal image) of the vehicle, which includes the distances and the speeds, may be generated. The controller 330 may generate a warning message, which is included in the surrounding state image of the vehicle, based on the distances and speeds. For example, when the distance is 50 (m) or more, and there is no change in speed, the warning message may be a message "maintenance of a current speed of the vehicle". When the distance is 50 (m) or more and there is the change in speed, the warning message may be a message "the speed of a forward vehicle is X km/h, be careful of the speed". So as for the driver of the vehicle to view the surrounding state image of the vehicle or the warning message, the controller 330 may control the HUD device 325 to display the surrounding state image of the vehicle or the warning message on a windshield of the vehicle.

In another embodiment of the present disclosure, steps 225 and 230 may be simultaneously performed (progressed).

A component, e.g. "unit", or block or module used in the embodiments of the present disclosure may be implemented as software such as a task, a class, a sub routine, a process, an object, an execution thread, and a program performed in a predetermined area on the memory or hardware such as field programmable gate array (FPGA) or application-specific integrated circuit (ASIC). The constituent element, e.g. " . . . unit", a block, or a module used in the embodiment of the present disclosure, may be implemented by combining the software and the hardware. The component or 'unit' may be included in a computer readable storage medium (i.e., a non-transitory storage medium) and some of the components or 'units' may be dispersedly distributed in a plurality of computers.

As described above, the embodiment is disclosed in the drawings and the specification. Although specific terms have been used herein, the terms are only used for the purpose of describing the present disclosure and should not be used to limit a meaning or limit the scope of the present disclosure as defined in the claims. Therefore, those having ordinary skill in the art should appreciate that various modifications and equivalent embodiments can be made from the present disclosure. Accordingly, the true technical scope of the present disclosure should be defined by the technical spirit of the appended claims.

DESCRIPTION OF SYMBOLS

300: Communicator
305: Infrared thermal camera
310: Camera
315: Image processor
320: Radar sensor
325: HUD device
330: Controller

What is claimed is:

1. A method for assisting a vision of a vehicle driver, the method comprising:
   receiving, by a controller, a signal indicating that weather information is emergency weather information from a navigation device according to setting by a vehicle driver of a vehicle, and turning on a vision assisting device of the vehicle driver included in the vehicle in response to the signal;
   obtaining, by the controller, an image of an infrared thermal camera of the vision assisting device, which photographs a front of the vehicle when the vehicle travels, and obtaining an image of a camera of the vision assisting device, which photographs the front of the vehicle when the vehicle travels;
   controlling, by the controller, an image processor of the vision assisting device to determine whether a matching rate between image data of the infrared thermal camera and image data of the camera is equal to or less than a first threshold; and
   when the matching rate is equal to or less than the first threshold, using, by the controller, distances between the vehicle and respective objects located at the front, a rear, and sides of the vehicle when traveling, speeds of the respective objects, which are detected by a radar sensor of the vision assisting device, and the images of the infrared thermal camera photographing the front of the vehicle to generate a surrounding state image of the vehicle, which includes the distances and the speeds.

2. The method of claim 1, further comprising:
controlling, by the controller, a head-up display (HUD) device to display the surrounding state image of the vehicle on a windshield of the vehicle.

3. The method of claim 2, further comprising:
generating, by the controller, a warning message, which is included in the surrounding state image of the vehicle, based on the distances and speeds; and
controlling, by the controller, the head-up display (HUD) device to display the warning message on the windshield of the vehicle.

4. The method of claim 1, further comprising:
when the matching rate is equal to or less than the first threshold, turning on, by the controller, an emergency light switch included in the vision assisting device and turning on the emergency light of the vehicle.

5. The method of claim 1, further comprising:
receiving, by the controller, the weather information of a place at which the vehicle is located, from a server located outside the vehicle through a communicator of the vision assisting device.

6. The method of claim 1, wherein:
the emergency weather information includes rainy or snowy weather information.

7. The method of claim 1, wherein:
the image processor converts the image data of the infrared thermal camera and image data of the camera into gray scale images, respectively, and compares the converted image data to calculate the matching rate.

8. A method for assisting a vision of a vehicle driver, the method comprising:
receiving, by a controller, a signal indicating that weather information is emergency weather information from a navigation device according to setting by a vehicle driver of a vehicle, and turning on a vision assisting device of the vehicle driver included in the vehicle in response to the signal;
obtaining, by the controller, an image of an infrared thermal camera of the vision assisting device, which photographs a front of the vehicle when the vehicle travels, and obtaining an image of a camera of the vision assisting device, which photographs the front of the vehicle when the vehicle travels;
controlling, by the controller, an image processor of the vision assisting device to determine whether a matching rate between image data of the infrared thermal camera and image data of the camera is more than a first threshold and equal to or less than a second threshold;
when the matching rate is more than the first threshold and is equal to or less than the second threshold, determining, by the controller, whether a signal indicating whether the vision assisting device needs to be used is received by the controller, from the navigation device; and
when the signal indicating whether the vision assisting device needs to be used is received, using, by the controller, distances between the vehicle and respective objects located at the front, a rear, and sides of the vehicle when traveling, speeds of the respective objects, which are detected by a radar sensor of the vision assisting device, and the images of the infrared thermal camera photographing the front of the vehicle to generate a surrounding state image of the vehicle, which includes the distances and the speeds.

9. The method of claim 8, further comprising:
controlling, by the controller, a head-up display (HUD) device to display the surrounding state image of the vehicle on a windshield of the vehicle.

10. The method of claim 9, further comprising:
generating, by the controller, a warning message, which is included in the surrounding state image of the vehicle, and which is based on the distances and speeds; and
controlling, by the controller, the head-up display (HUD) device to display the warning message on the windshield of the vehicle.

11. The method of claim 8, further comprising:
when the signal indicating whether the vision assisting device of the vehicle driver needs to be used is received, turning on, by the controller, an emergency light switch that is included in the vision assisting device and turns on an emergency light of the vehicle.

12. The method of claim 8, further comprising:
receiving, by the controller, the weather information of a place at which the vehicle is located, from a server located outside the vehicle through a communicator of the vision assisting device.

13. The method of claim 8, wherein:
the emergency weather information includes rainy or snowy weather information.

14. The method of claim 8, wherein:
the image processor converts the image data of the infrared thermal camera and image data of the camera into gray scale images, respectively, and compares the converted image data to calculate the matching rate.

15. A device for assisting a vision of a vehicle driver, the device comprising:
an infrared thermal camera photographing, when a vehicle travels, a front of the vehicle;
a camera photographing, when the vehicle travels, the front of the vehicle;
and a controller receiving a signal indicating that weather information is emergency weather information from a navigation device according to setting by a vehicle driver of a vehicle, and turning on a vision assisting device of the vehicle driver included in the vehicle in response to the signal,
wherein the controller obtains an image of the infrared thermal camera and an image of the camera,
wherein the controller controls an image processor of the vision assisting device to determine whether a matching rate between image data of the infrared thermal camera and image data of the camera is equal to or less than a first threshold, and
when the matching rate is equal to or less than the first threshold, the controller uses distances between the vehicle and respective objects located at the front, a rear, and sides of the vehicle when traveling, speeds of the respective objects, which are detected by a radar sensor of the vision assisting device, and the images of the infrared thermal camera to generate a surrounding state image of the vehicle, which includes the distances and the speeds.

16. The device of claim 15, wherein:
the controller controls a head-up display (HUD) device to display the surrounding state image of the vehicle on a windshield of the vehicle.

17. The device of claim 16, wherein:
the controller generates a warning message, which is included in the surrounding state image of the vehicle, and which is based on the distances and speeds, and
the controller controls the head-up display (HUD) device to display the warning message on the windshield of the vehicle.

18. The device of claim 15, wherein:
when the matching rate is equal to or less than a first threshold, the controller turns on an emergency light switch included in the vision assisting device and turning on the emergency light of the vehicle.

19. The device of claim 15, wherein:
the controller receives the weather information of a place at which the vehicle is located, from a server located outside the vehicle through a communicator of the vision assisting device.

20. The device of claim 15, wherein: the image processor converts the image data of the infrared thermal camera and the image data of the camera into gray scale images, respectively, and compares the converted image data to calculate the matching rate.

\* \* \* \* \*